US008452797B1

(12) United States Patent
Paleja et al.

(10) Patent No.: US 8,452,797 B1
(45) Date of Patent: May 28, 2013

(54) PERSONALIZED RECOMMENDATIONS BASED ON ITEM USAGE

(75) Inventors: Ameesh Paleja, Irvine, CA (US);
Mekka C. Okereke, Irvine, CA (US);
Matthew A. Jones, Ladera Ranch, CA (US)

(73) Assignee: Amazon Technologies, Inc., Reno, NV (US)

( * ) Notice: Subject to any disclaimer, the term of this patent is extended or adjusted under 35 U.S.C. 154(b) by 55 days.

(21) Appl. No.: 13/044,196

(22) Filed: Mar. 9, 2011

(51) Int. Cl.
*G06F 17/30* (2006.01)
(52) U.S. Cl.
USPC .......................................... 707/767; 707/805
(58) Field of Classification Search
USPC ................. 707/767, 776, 758, 780, 737, 751, 707/732, E17.043, E17.109, E17.017, E17.014, 707/805; 705/26.7, 347, 14.67, 26.5, 26.61, 705/26.63, 27.2, 29, 27
See application file for complete search history.

(56) References Cited

U.S. PATENT DOCUMENTS

| | | | |
|---|---|---|---|
| 6,266,649 B1* | 7/2001 | Linden et al. ................. | 705/7.29 |
| 7,702,690 B2* | 4/2010 | Brave et al. ................... | 707/776 |
| 7,856,446 B2* | 12/2010 | Brave et al. ................... | 707/776 |
| 2002/0161664 A1* | 10/2002 | Shaya et al. .................... | 705/26 |
| 2003/0105682 A1 | 6/2003 | Dicker et al. | |
| 2004/0043758 A1* | 3/2004 | Sorvari et al. ............. | 455/414.1 |
| 2006/0185027 A1* | 8/2006 | Bartel et al. .................... | 800/14 |
| 2006/0200432 A1 | 9/2006 | Flinn et al. | |
| 2007/0294140 A1* | 12/2007 | Bezos et al. ..................... | 705/27 |
| 2008/0154712 A1* | 6/2008 | Wellman ........................ | 705/11 |
| 2008/0201225 A1 | 8/2008 | Maharajh et al. | |
| 2008/0250323 A1 | 10/2008 | Huff | |
| 2009/0163183 A1* | 6/2009 | O'Donoghue et al. .... | 455/414.1 |
| 2009/0234815 A1 | 9/2009 | Boerries et al. | |
| 2009/0298514 A1* | 12/2009 | Ullah ......................... | 455/456.5 |
| 2009/0307262 A1 | 12/2009 | Jeong et al. | |

(Continued)

OTHER PUBLICATIONS

August0 A. de Albuquerque—"High Speed Optical Networks projects in the EC RACE programme: from the Customer Access Co~ect ionto the Transit Network"—Commission of the European Communities, ⁴/₃₀, Rue de la Loi 200, 1049 Brussels, Belgium—Communications, 1993. ICC '93 Geneva. Technical Program, C May 23-26, 1993—pp. 1215-1219 vol. 2.*

(Continued)

*Primary Examiner* — Shahid Alam
*Assistant Examiner* — Anh Ly
(74) *Attorney, Agent, or Firm* — Knobbe Martens Olson & Bear LLP

(57) ABSTRACT

This disclosure describes systems and associated processes for generating recommendations for users based on usage, among other things. These systems and processes are described in the context of an interactive computing system that enables users to download applications for mobile devices (such as phones) or for other computing devices. Users' interactions with applications once they are downloaded can be observed and tracked, with such usage data being collected and provided to the interactive computing system. The interactive computing system can include a recommendation system or service that processes the usage data from a plurality of users to detect usage patterns. Using these usage patterns, among possibly other data, the recommendation system can recommend applications to users for download.

16 Claims, 7 Drawing Sheets

U.S. PATENT DOCUMENTS

| | | | |
|---|---|---|---|
| 2010/0029003 A1* | 2/2010 | Bartel et al. | 435/455 |
| 2010/0191744 A1* | 7/2010 | Meyerzon et al. | 707/749 |
| 2010/0268661 A1 | 10/2010 | Levy et al. | |
| 2010/0287031 A1 | 11/2010 | Mckenna | |
| 2011/0021434 A1* | 1/2011 | Abell et al. | 514/16.9 |
| 2011/0047597 A1 | 2/2011 | Mahaffey et al. | |
| 2011/0307354 A1* | 12/2011 | Erman et al. | 705/27.1 |
| 2011/0320307 A1* | 12/2011 | Mehta et al. | 705/26.7 |
| 2012/0072283 A1 | 3/2012 | DeVore et al. | |
| 2012/0179973 A1 | 7/2012 | Brolley et al. | |
| 2012/0303477 A1* | 11/2012 | Ben-Itzhak | 705/26.7 |

OTHER PUBLICATIONS

McFaddin et al.—"Modeling and Managing Mobile Commerce Spaces using RESTful Data Services"—The Ninth International Conference on Mobile Data Management—Apr. 27-30, 2008—pp. 81-89.*

RAO, "Flurry Brings Recommendation Engine to Android Apps", TechCruch—Highlights and videos from CrunchGear's CES coverage, http://techcrunch.com/2010/08/11/flurry-brings-recommendation-engine-to-android-apps/ (Jan. 17, 2011).

* cited by examiner

PERSONALIZED RECOMMENDATIONS BASED ON ITEM USAGE

BACKGROUND

A variety of methods are known for detecting behavior-based associations (associations based on user behaviors) between items stored or represented in a database. For example, the purchase histories or item viewing histories of users can be analyzed to detect behavior-based associations between particular items represented in an electronic catalog (e.g., items A and B are related because a relatively large number of those who purchased A also purchased B). As another example, the web browsing histories of users can be analyzed to identify behavior-based associations between particular web sites and/or web pages.

The detected behavior-based associations are typically used to assist users in locating items of interest. For example, in the context of an electronic catalog, when a user accesses a network resource, such as a web page, that is associated with an item, the resource may be supplemented with a list of related items. This list may, for example, be preceded with a descriptive message such as "people who bought this item also bought the following," or "people who viewed this item also viewed the following." The detected associations may also be used to generate personalized recommendations that are based on the target user's purchase history, item viewing history, and/or other item selections.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION

I. Introduction

Figure 1:
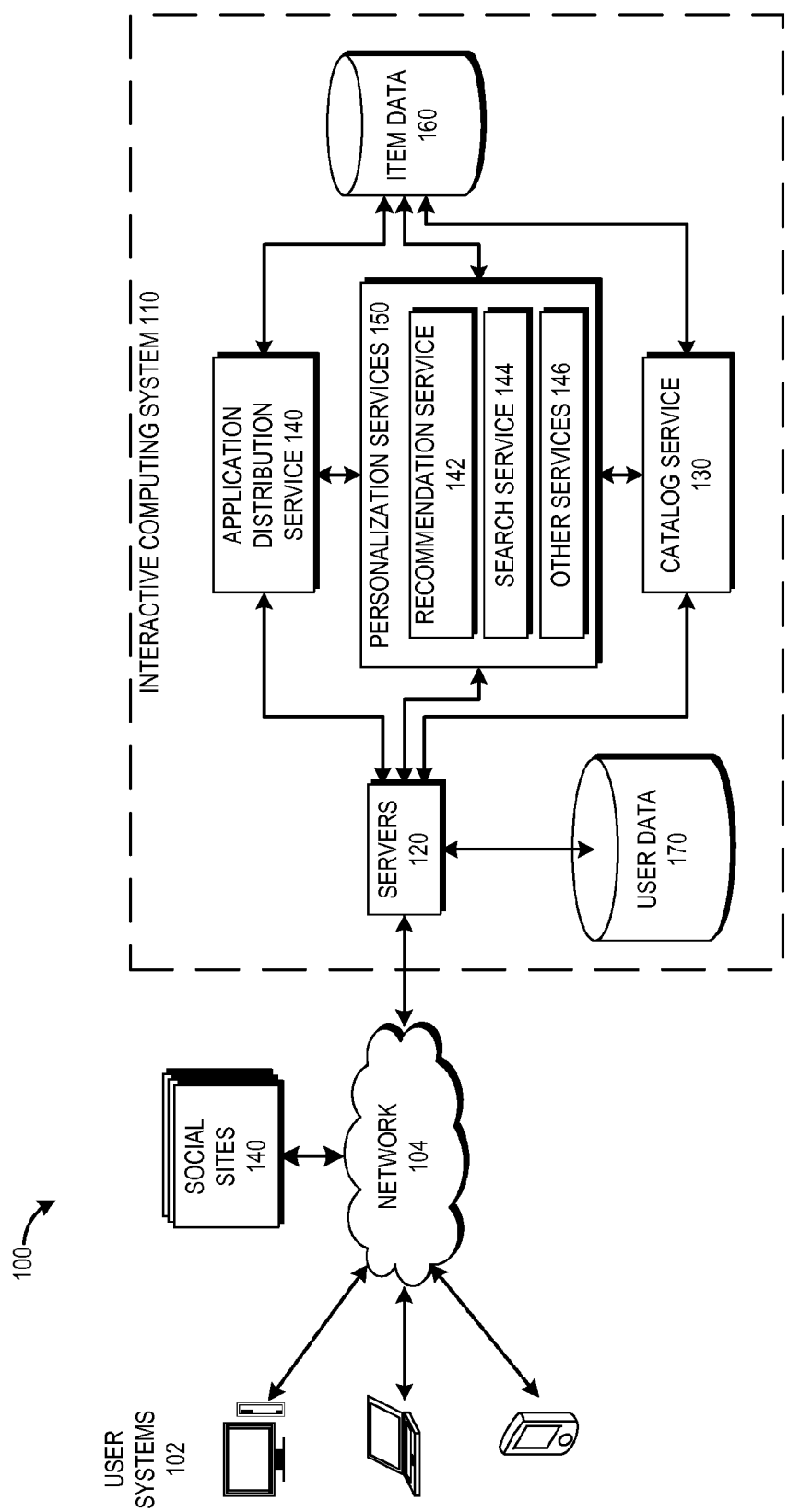
FIG. 1 illustrates an embodiment of a network environment for providing users with access to an interactive computing system.

Personalized recommendations are often generated for users based on a user's interactions in an electronic catalog, which can include user purchases and item selections (e.g., page requests). Once a user purchases an item, however, little is often known about actual usage of the item by the user. If a user purchases a DVD player, for instance, the recommendations algorithm would typically not know whether the user likes the DVD player, how often the user uses it, when the user uses it, and so forth. Thus, currently-available recommendation systems typically do not factor usage into account when making recommendations.

This disclosure describes systems and associated processes for generating recommendations for users based on usage, among other things. These systems and processes are described in the context of an interactive computing system that enables users to download applications for mobile devices (such as phones) or for other computing devices. Users' interactions with applications once they are downloaded can be observed and tracked, with such usage data being collected and provided to the interactive computing system. The interactive computing system can include a recommendation system or service that processes the usage data from a plurality of users to detect usage patterns. Using these usage patterns, among possibly other data, the recommendation system can recommend applications to users for download. Many other embodiments are also possible and are described in greater detail below.

For purposes of illustration, the processes disclosed herein are described primarily in the context of an interactive computing system that provides applications for download. As will be apparent, however, the disclosed processes can also be used in other types of systems, and can be used to recommend other types of items, such as but not limited to products and services, electronic books ("ebooks"), web sites, news articles, blogs, podcasts, travel destinations, service providers, other users (e.g., as potential friends in a social network), events, discussion boards, photos and other images, online videos, tagged items, and user-generated lists of items. In addition, the disclosed processes need not be implemented as part of, or in conjunction with, a web site.

As used herein, the term "item," in addition to having its ordinary meaning, is used interchangeably to refer to an item itself (e.g., a particular product, application, or the like) and to its description or representation in a computer system. As will be apparent from the context in which it is used, the term is also sometimes used herein to refer only to the item itself or only to its representation in the computer system. As used herein, the term "application," in addition to having its ordinary meaning, can mean, among other things, executable code or instructions, interpreted code or instructions (such as Java™ bytecode or the like), scripted code, source code, object code, assembly code, any of the above together with associated data, and the like.

II. Interactive Computing System Overview

FIG. 1 depicts an embodiment of a network environment 100 suitable for providing users with access to an interactive computing system 110. In the environment 100, users can access the interactive computing system 110 and other social sites 120, such as social networking sites, with user systems 102. The interactive computing system 110 can collect application (or other item) usage information from the user system 102. The interactive computing system 110 can analyze this usage information to detect usage patterns, which can form the basis for personalized application (or other item) recommendations. In some embodiments, the interactive computing system 110 can also use social data, such as from social networking sites (e.g., social sites 140), to generate personalized application recommendations. Further, the interactive computing system 110 can also generate many other types of recommendations, some examples of which are described herein.

The user systems 102 that access the interactive computing system 110 can include computing devices, such as desktop computers, laptop computers, tablets, personal digital assistants (PDAs), mobile phones (including smart phones), electronic book readers, other wireless devices, set-top or other television boxes, media players, game platforms, and kiosks, among others. The user systems 102 access the interactive computing system 110 and the social sites 120 over a network 104, which can be a local area network or a wide area network, such as the Internet.

The interactive computing system 110 can be implemented with one or more physical servers or computing machines. Thus, each of the components depicted in the interactive computing system 110 can include hardware and/or software for performing various features. In one embodiment, the interactive computing system 110 is a web site or a collection of web sites. Likewise, the social sites 120 can be implemented with one or more physical servers or computing machines and can also be web sites. The social sites 120 can be operated by entities who are different from one another and who are different from an operator of the interactive computing system 110.

The interactive computing system 110 includes an application download service 150. The application download service 150 can be an application store or the like that makes applications available for download or streaming to the user systems 102, for free or upon payment. The application download service 150 can include components for browsing and/or searching a catalog of applications, which may be stored in an item data repository 160. The application download service 150 can, but need not, rely on the functionality of a separate catalog service 130 (described below) for this browse and/or search functionality.

The interactive computing system 110 also includes personalization services 140, which can include services for providing personalized information to users. Examples of personalization services 140 include a recommendation service 142, a personalized search service 144, and other services 146 such as a tag-based service. The recommendation service 142 is described in detail below. The search services 144 can recommend personalized search results to users based on an analysis of previous search behavior. Tag-based services can provide functionality for users to apply textual tags to items in the catalog to thereby categorize the items. Other personalization services can include list services for allowing users to create lists of items, blogging services, personalized social networking services, and the like.

Advantageously, in certain embodiments, the recommendation service 142 can generate usage-based recommendations. The recommendation service 142 can generate these recommendations using usage data collected from the user systems 102. As an example, the recommendation service 142 can collect data regarding application usage times and frequency. The recommendation service 142 can also collect information regarding locations in which applications were used, or in which the user systems 102 were used. With this usage information, the recommendation service 142 can identify related applications that have been used by other users in similar ways. The recommendation service 142 can provide recommendations to users that include applications that are related to applications installed on the user systems, based on usage, among possibly other factors.

The recommendation service 142 can also generate social-graph based recommendations that take into account a user's social graph or network of related users (such as friends and family). A user's friends may have applications on their user systems 102 that are of interest to the user. The recommendation service 142 can therefore identify a user's related users, determine which items those users have or have downloaded from the application distribution service 140, and can recommend such items to the user. Social recommendations can also be combined with usage recommendations, as will be described in greater detail below.

The recommendation service 142 can collect data regarding a user's related users from the social sites 140. The social sites 120 can include collaborative sites, such as social networking sites, forums, web publishing sites (e.g., blogs), and chat sites, among others. In one embodiment, the recommendation service 142 accesses the social sites 140 through the network 104 to collect data generated or consumed by users of the social sites 140. The users of the social sites 140 can also be users of the interactive computing system 110. Accordingly, in one embodiment these users have an account or other relationship with both the interactive computing system 110 and with one or more of the social sites 140. Thus, the data collected from the social sites 140 for a certain user can supplement or replace the same user's catalog activity data stored in the user data repository 170. In some embodiments, the interactive computing system 110 can also include features similar to those of the social sites 140. Thus, for example, the interactive computing system 110 can also include social networking features.

Moreover, the recommendation service 142 can also use any of a variety of other algorithms for generating recommendations, including various other behavior-based algorithms. In some embodiments, such behavior-based algorithms can analyze user behavior to generate item-to-item similarity mappings and can use these mappings to recommend items related to a user's item selection activities. Examples of such recommendation algorithms, which can be used herein, are described in U.S. Publication No. 2002/0198882, filed Jan. 14, 2002, titled "Content Personalization Based on Actions Performed During a Current Browsing Session," the disclosure of which is hereby incorporated by reference in its entirety. These behavior-based algorithms can be combined with any of the usage or social based algorithms described herein, as will be described in greater detail below.

The interactive computing system 110 also includes a catalog service 130 and associated search engine (not shown). Users can browse an electronic catalog provided by the catalog service 130 or query the search engine to obtain information about electronic catalog content stored in an item data repository 160. In one embodiment, these items can include items other than (or in addition to) applications, such as media (books, audio, video, etc.), clothes, electronics, and appliances, to name a few. The electronic catalog content can include detailed information about these products as well as services. In one embodiment, this content is arranged in a hierarchical structure, having items associated with one or more categories or browse nodes in a hierarchy. The catalog service 130 can provide functionality for users to browse the item hierarchy in addition to searching the catalog. Users can select an item represented in the hierarchy or in a list of search results to see more details about an item. In response to a user item selection, the server 120 can provide to a user system 102 a catalog page (sometimes called an item detail page) that includes details about the selected item. In one embodiment, the applications available for downloads from the application distribution service 140 are also described in this catalog.

The processing of the various components of the interactive computing system 110 can be distributed across multiple machines, networks, and other computing resources. The various components of the interactive computing system 110 can also be implemented in one or more virtual machines, rather than in dedicated servers. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

III. Data Collection and Mining Techniques

Figure 2:
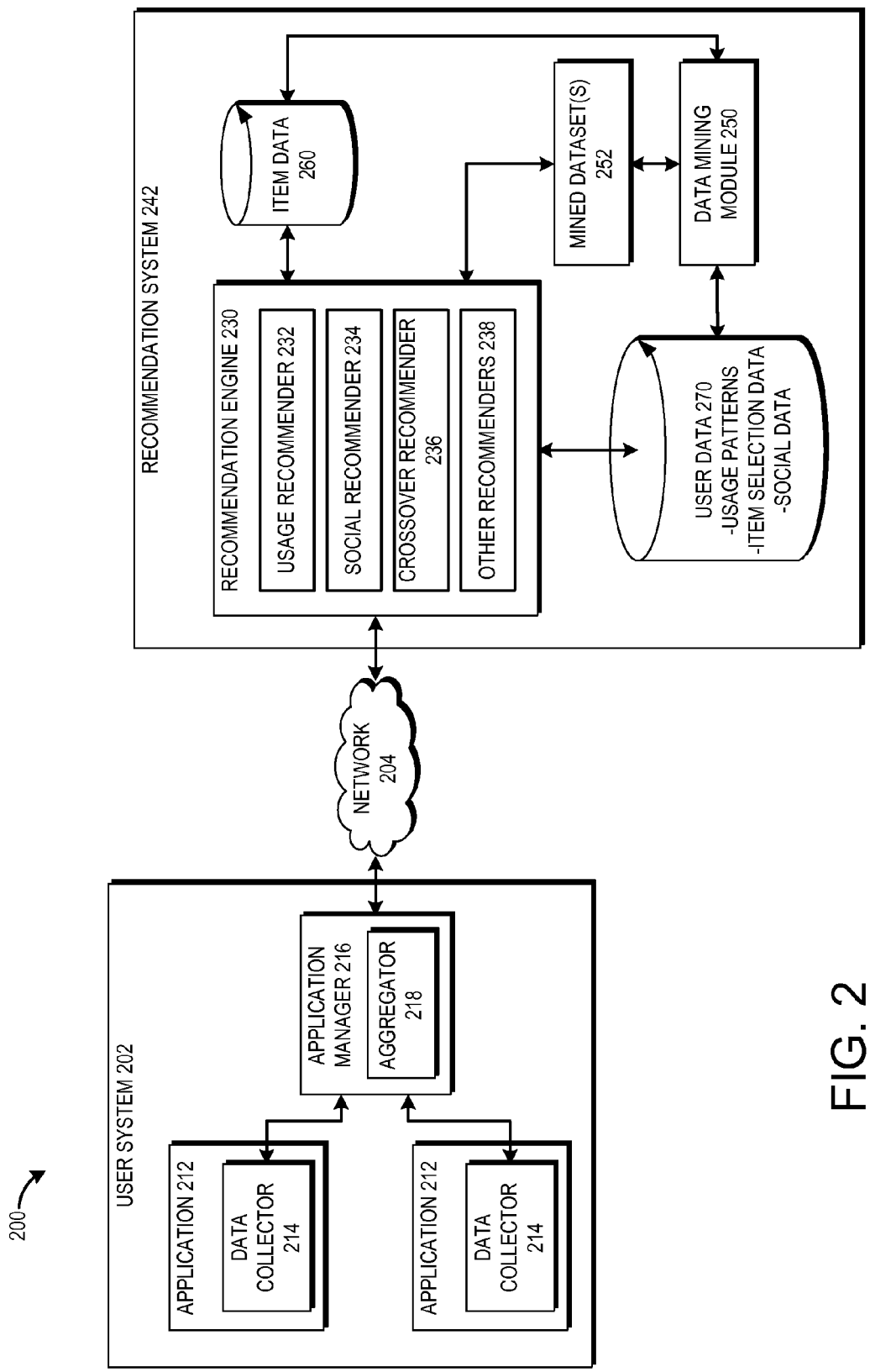
FIG. 2 illustrates a more detailed network environment that includes a usage-based recommendation system.

FIG. 2 illustrates a more detailed network environment 200 including a recommendation system 242. In the network environment 200, an example user system 200 is illustrated communicating with a recommendation system 242 over a network 204. The depicted user system 202 is a more detailed example of the user systems 102 described above. Likewise, the network 204 can be similar to the network 104 described above, and the recommendation system 242 can include some or all of the features of the recommendation service 142. However, the recommendation system 242 can be used as a stand-alone system and need not be coupled with the other features of the interactive computing system 110. Each of the components shown in FIG. 2 can include hardware and/or software for performing various functions.

FIG. 2 primarily describes usage data collection techniques and data mining techniques. Such data collection and mining techniques can facilitate recommendations based on usage, social data, and the like. Recommendation features, while also described with respect to FIG. 2, are described in more detail below with respect to FIGS. 3 through 5.

In the depicted embodiment, the user system 202 includes applications 212. Examples of applications 212 that might be found on a mobile device, for instance, can include video game applications, office productivity applications, network-based applications, and so on. The user of the user system 202 may have obtained these applications from an application store (or "app store"), such as the application distribution service 140 of FIG. 1. The applications 212 can be obtained from more than one application store, however. Further, in the case where the user system 202 is a desktop, laptop, or other such device, the applications 212 can be obtained from traditional brick-and-mortar stores or online stores instead of (or possibly in addition to) from an application store.

Each application 212 includes a data collector 214 in the depicted embodiment. The data collector 214 can include one or more components capable of obtaining usage data, location data, and/or possibly other information from the application 212. In one embodiment, the data collector 214 for each application is supplied by the application distribution service 140 or by an application manager 216 (described below). In response to a developer submitting an application 212 to the application distribution service 140 for distribution, the application distribution service 140 can combine the data collector 214 with the application 212.

One way that the application distribution service 140 can combine the data collector 214 with the application 212 is to decompile the application 212, detect routines where relevant usage information may be obtained, and inject data collector 214 code into those routines. The application distribution service 140 can then recompile the application and distribute the application to user systems in response to download requests. An advantage of this approach to data collecting is that application developers need not design their applications to submit usage data or other metrics. Further, this decompile and repackage process can be used to add other functionality to the applications 212, such as digital rights management (DRM) technology.

The data collector 214 can be inserted into lifecycle routines of the application 212, which can include event handler routines or other routines (e.g., functions, methods, or the like) that are called when the application 212 launches, terminates, pauses, resumes from a wait or pause state, or the like. The data collector 214 can collect usage data by performing certain actions when one of these lifecycle routines is called by the application 212. For instance, when the application 212 launches, the data collector 214 can log a timestamp or start a timer to mark the beginning of a usage period. When the application 212 pauses or terminates, the data collector 214 can log a second timestamp or stop the timer to determine a usage time, which can be equivalent or approximately equivalent to runtime in some embodiments.

In one embodiment, the data collector 214 can include replacement or supplemental lifecycle routines, classes, or methods that are called in place of, or prior to, existing lifecycle routines. For example, the data collector 214 can include a subclass of a base class used by the application 212. The subclass of the data collector 214 can be called and/or executed before any subclass of the application 212 is called and/or executed. As an example, in the Android™ operating system available for mobile devices from Google®, lifecycle entry points or routines such as on Create( ) on Start( ) on Pause( ) on Resume( ) and on Destroy( ) are used by applications to handle application launch, start, pause, resume, and exit events, respectively. The data collector 214 can include versions of one or more of these lifecycle methods in a class that is a subclass of the Activity base class used by some or all Android applications. When one of the lifecycle routines is called, the data collector 214 version of the routine can be called before (or in some embodiments, after) the corresponding routine of the application 212 is called, allowing the data collector 214 to collect data about the application 212.

The data collector 214 can log various types of usage information, such as total runtime of an application, a session runtime of the application, the time of day and/or day of week that an application is run, combinations of the same, or the like. The data collector 214 can also collect usage data representing the frequency of application launches, pauses, resumes, and/or terminations. Further, the data collector 214 can collect usage data reflecting application 212 crashes or other stability issues (such as rapid termination after launch, ungraceful exits, or thrown exceptions). The data collector 214 can also access other programs and/or services to determine time and usage information. For instance, the data collector 214 can access a calendar program to determine when a user is about to embark on a flight. The recommendation system 242 described below can use this information to provide recommendations for applications that are usable in-flight (e.g., that do not rely on network services that may be prohibited or unavailable on some flights).

Further, in some embodiments, the data collector 214 can log usage data related to the user system's 202 current location when the application 212 is being used. The data collector 214 can determine this location information from global positioning system (GPS) information obtained from a GPS device in the user system 202. Alternatively, the data collector 214 can use cell-phone tower or wireless hotspot triangulation techniques to determine location. In other embodiments, the location information corresponding to a user system 202 can be determined external to the user system 202, such as by the recommendation system 242. The recommendation system 242 may, for instance, access a user's address on file or shipping address with the interactive computing system 110.

Another type of usage data that can be obtained from the user system 202 is related device usage. Related device usage can arise in device auto-discovery situations. Technologies such as Universal Plug-and-Play (UPNP) allow mobile devices to wireless auto-detect compatible devices, for example, in a user's home. A user might use his mobile phone, for instance, to communicate with his or her television or vehicle as a remote control. A user can download applications that allow the user system 202 to control or otherwise communicate with other devices, such as televisions, stereos, computers, appliances, thermostats, garage doors, vehicles, and the like. Other technologies, such as Digital Living Network Alliance (DLNA) streaming technologies, can be used in a similar manner to detect device relationships between media streaming devices, televisions, audio systems, and other user systems. Thus, the data collector 214 can collect information about which devices an application interacts with.

The data collector 214 for each application 212 can provide the collected usage data to an application manager 216. The application manager 216 can include an aggregator 218 component that aggregates metrics gathered by the data collectors 214 and that provides the aggregated metrics to the recommendation system 242. The application manager 216 is also an example of an application store client in some embodiments, which can communicate with an application store (such as the application distribution service 140) to download or otherwise obtain applications. The application manager 216 can also gather data in addition to, or in place of, the data collectors 214 in some embodiments, for example, by monitoring start and stop times of the applications 212 or any of the other usage information described above.

In alternative implementations, the data collectors 214 provide data directly to the recommendation system 242 instead of through the application manager 216. In still other alternative embodiments, the applications 212 are designed by developers to report metrics directly to the recommendation system 242 or through the application manager 216 without using a separate data collector 214 provided by the interactive computing system 110.

The recommendation system 242 receives the aggregated metrics from the user system 202 and stores the metrics in a user data repository 270. A data processor (not shown) can organize and store the metrics in the user data repository 270. The data can be stored according to users, so that usage data and other data can be tracked per user (or alternatively, per application). The aggregated metrics can represent usage data, which a recommendation engine 230 of the recommendation system 242 can use to generate usage-based recommendations.

Other data that the user data repository 270 can store can include, fore example, social data, including data about a user's related users and the applications they have downloaded or installed (see FIG. 4), and item selection data regarding a user's application viewing and/or purchasing habits. The application manager 216 and/or the application distribution service 140 can track item selection data as a user browses, searches, and/or downloads items in an application store catalog. More generally, any user activity data with respect to the application distribution service 140 and/or the general electronic catalog (which describe general products and services) can be stored in the user data repository 270 for consumption by the recommendation engine 230.

A data mining module 250 is also provided, which can perform behavioral mining of the user data in the user data repository 270 to produce one or more mined datasets 252. The mined datasets 252 can include behavioral associations between applications (or other items) identified based on any of a variety of criteria. The data mining module 250 can detect behavioral associations between applications based on usage data patterns, for instance. The data mining module 250 can detect these associations using item-to-item collaborative filtering techniques. Such techniques can include assigning numerical or other degrees of association or similarity to applications that were both purchased or both selected for viewing by a plurality of users, e.g., in a single session. Item-to-item association or similarity detection techniques are described in greater detail in U.S. Publication No. 2002/0198882, referred to above, which techniques can be incorporated by the data mining module 250.

The data mining module 250 can also detect other types of associations between applications. Advantageously, in certain embodiments, the data mining module 250 detects usage-based associations between items by relating items that are used in a similar manner to one another. The more related the usage of two items is, the higher the degree of association between those items can be. The relatedness of two items based on usage can be derived using a variety of factors. For instance, the data mining module 250 can relate two applications that are used with similar frequency. Two video games that are played in short increments, such as games like Angry Birds™ and Tetris™, might be related based on this similar usage pattern. Other games might be played by users in longer stretches and could be similarly associated together. Such temporal-based usage patterns can be ascertained by the data mining module 250 from the usage data in the user data repository 270.

These temporal relationships can also lead to the observation that different applications are used differently by different users. Some users prefer to play games, for instance, in short increments, such as when in a line at the grocery store, while others users prefer to play games in longer segments (such as 1-2 hours at a time). This application usage behavior can be indicative of relationships between applications, giving rise to the creation of usage associations between applications. Further, this behavior can also reflect relatedness between users. Application usage data can therefore also be mined to detect user-to-user associations. Recommendations can be based on item-to-item associations, user-to-user associations, or both.

Other temporal relationships can be detected by the data mining module 250 from the usage data. For instance, the data mining module 250 might relate or associate two applications (or users) that are used primarily on nights and weekends, or during other time periods. Restaurant-finding applications are examples of applications that might have such usage patterns because users may often seek out restaurants on nights and weekends. The data mining module 250 can also relate items based on location-similarities. Two applications that are used in similar locations, such as in a moving vehicle (e.g., as determined by rapidly changing GPS data), or the like, might be related. For instance, users may often play short games when taking public transportation. Such games (or users) could therefore be assigned a relationship or association. Similarly, users who use one application on an airplane might use another such application on an airplane. The data mining module 250 can detect many other types of such usage associations.

More generally, the data mining module 250 can detect usage patterns involving possibly a variety of factors, including those discussed herein. Such usage patterns can reflect an application's usage or a user's usage habits, allowing similar applications or users to be detected based on the usage patterns. An example usage pattern might be detected as follows: a mobile device user may tend to use an application in short bursts while in mobile coverage while using the application for longer periods when in wireless (e.g., WiFi) coverage. As another example, a user might use a traffic-checking application frequently during the hours of 4-6 PM but infrequently at other times. Many different factors, such as wireless versus mobile coverage, day, frequency, usage time, location, and so forth can be gathered about an application or user to form a usage pattern. The user data repository 270 can store such information in association with an application and/or user, thereby enabling the data mining module 250 to detect similar items based on similar usage patterns.

The data mining module 250 can also detect application relationships based on related devices used with applications. As described above, some applications allow the user system 202 to communicate with other devices in a user's home, vehicle, or other location. The data mining module 250 can create associations between such applications, based on the usage data mined from users and/or based on metadata associated with such applications that identifies their typical usage. This mined data can allow recommendations to be provided to a user when a user system 202 is within communication range of a compatible device, for example, by suggesting applications that can control the compatible device.

Several different ways for relating applications or other items have been described. The data mining module 250 can create a separate dataset 252 for each such technique. As an example, the data mining module 250 might create a dataset 252 reflecting how related applications are based on usage frequency, another dataset 252 based on usage location, one or more datasets that relate users instead of items, and so on. Alternatively, or in addition to creating separate datasets, the data mining module 250 can create a single mined dataset that reflects a possibly weighted combination of some or all usage attributes. Thus, for example, the data mining module 250 could assign a combined association score to pairs of applications based on their degree of similar usage frequency, usage times, usage locations, and so on. Thus, usage associations datasets 252 can reflect an aggregated analysis of usage statistics or some analysis of fewer than all such statistics.

The usage associations dataset 252 can be conceptualized as a graph having nodes that represent applications (or general items) and weighted edges having weights that represent degrees of association based on similar usage. The usage associations dataset 252 can be stored as a table, matrix, list, or the like that stores applications together with usage association scores. In another embodiment, the usage associations dataset 252 can be conceptualized as a graph having nodes that represent users and weighted edges that represent degrees of associations between users.

Further, a dataset can be created that relates applications to other non-application items, which can be used by the crossover recommender 236 described below. Non-application items can include any item available in the electronic catalog (see FIG. 1), some examples of which include media, clothes, electronics, and appliances, to name a few. The data mining module 250 can detect behavioral associations between users that purchase, download, view, or otherwise select certain applications and that also purchase, view, or otherwise select certain items in the electronic catalog. For example, if several users who selected a gourmet cooking application also selected high-end cookware, the data mining module 250 could create an association in data storage between data representing the application and the high-end cookware. Further, the data mining module 250 can create such associations based on the usage of the application in addition to or instead of based on selection of the application. A stronger association might be created between the gourmet cooking application and the high-end cookware, for instance, if many users actually use the gourmet cooking application frequently.

In some cases, the data mining module 250 may add usage metadata to item data in an item data repository. The usage metadata can reflect aggregate usage of particular applications represented in the item data repository 260. For instance, the data mining module 250 can compute an average usage frequency or time or other related statistics of the same and store such statistics as the usage metadata. The data mining module 250 can also store aggregate information regarding locations where applications are used in the item data repository 260. This usage metadata can be used by the recommendation engine 230 in ways that are described below.

The data mining module 250 can also collect and mine social data. The collection and mining of social data is described in detail below with respect to FIG. 4. The data mining module 250 can also collect item selection data, including data about a user's application or other item purchase history and browse history. The browse history can include selection actions such as catalog page requests, additions of items to wish lists and shopping carts, user interface events (such as mouse movements), and the like. A user's browse history can also include click stream data. Click stream data can include data on item selections that a user makes during a current browse session. A user's click stream can include selections made by a pointing device (e.g., by clicks or other mouse movements), keyboard (e.g., pressing the "Enter" key on a link), touch screen input, or by some other device. The data mining module 250 can store purchase history data and browse history data in the user data repository 152. The data mining module 250 can also create item-to-item associations based on users' item selection activity.

In one implementation, the data mining module 250 can use user-based collaborative filtering techniques to create that user-to-user associations described above. For instance, the data mining module 250 can access user profiles in the user data 270 and determine how closely related user profiles are based on the usage data, social data, and/or item selection data. Users with similar game playing habits, for instance, might be related. This user-based relationship information can also be stored as a mined dataset 252, usable by the recommendations engine 230.

The recommendation engine 230 includes several recommenders 232-238 that can use the mined dataset(s) 252 and/or item data 260 to generate recommendations. Any of the recommenders 232-238 shown can be optional in some embodiments. Each recommender 232-238 can represent a recommendation algorithm, implementable in computer hardware, which can generate personalized, targeted recommendations to users.

By way of overview, the example recommenders shown include a usage recommender 232, a social recommender 234, and a crossover recommender 236. Other recommenders 238 are also contemplated. Each recommender can recommend items such as applications to users. The usage recommender 232 can generate recommendations based on the user data 270 for a particular user in combination with the usage associations datasets described above. The usage recommender 232 can generate any of the types of recommendations described above in connection with the data mined by the data mining module 250 (see FIGS. 3A and 3B). The social recommender 234 can recommend applications based on the user data 270 for a particular user as well as based on social data regarding applications installed by related users (see FIG. 4). The crossover recommender can recommend products and services other than applications to users of applications and vice versa (see FIG. 5). Many other recommender 238 algorithms can be used in conjunction with or in place of these recommenders 232-236.

Each recommender can score the recommendations it generates as a way of ranking the recommendations. The recommendation engine 230 can combine the outputs of the recommenders to generate an overall ranked list of recommendations. If the recommenders 232-238 use different scoring scales to score the recommendations, the recommendation engine 230 can use the normalization algorithms described in U.S. Publication No. 2009/006373 to normalize and/or weight the outputs of the recommenders 232-238. The disclosure of U.S. Publication No. 2009/006373, filed Jun. 29, 2007, and entitled "Recommendation System With Multiple Integrated Recommenders," is hereby incorporated by reference in its entirety.

IV. Usage-Based Recommendations Processes

Figure 3A:
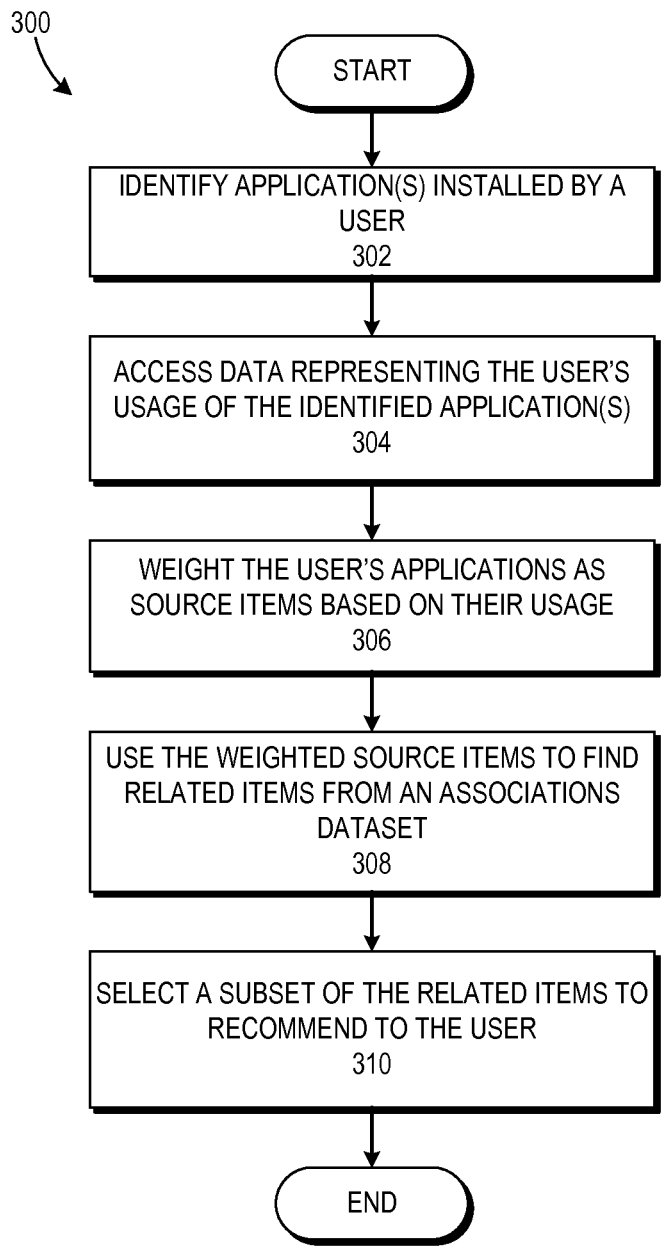
FIGS. 3A and 3B illustrate embodiments of processes for providing usage-based recommendations.
Figure 3B:
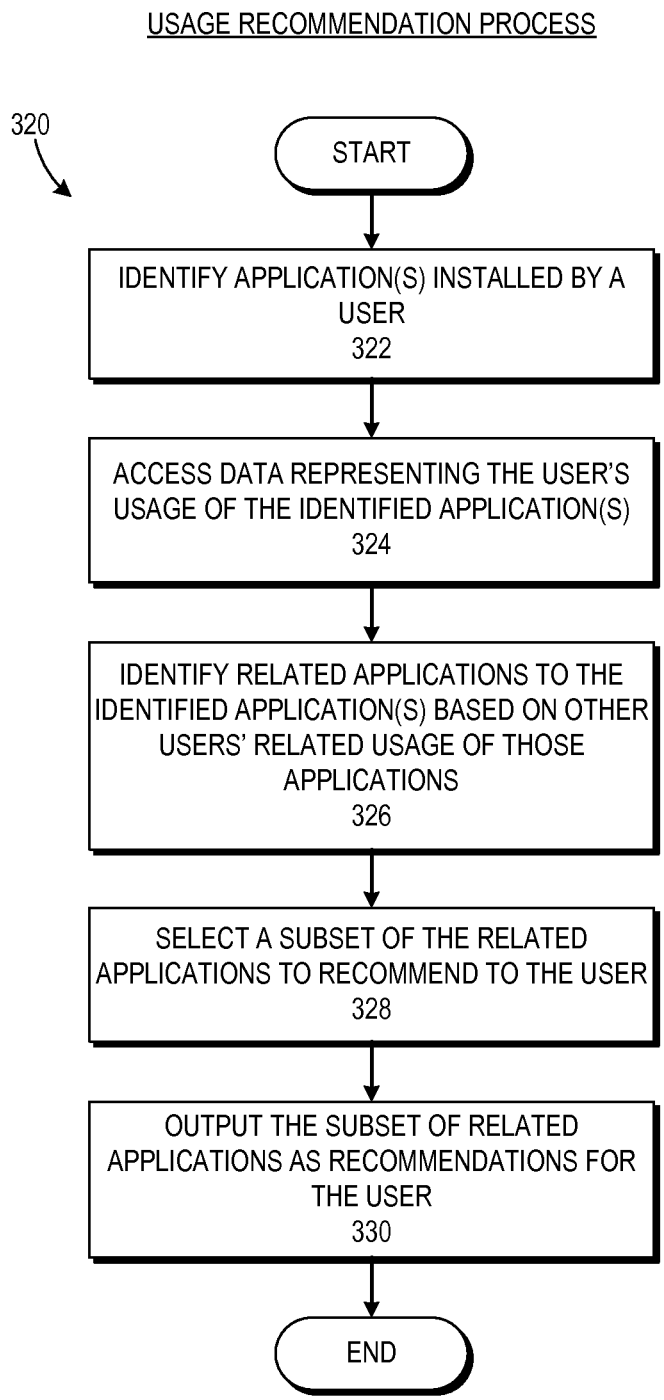

FIGS. 3A and 3B illustrate embodiments of processes 300A, 300B for providing usage-based recommendations. FIG. 3A illustrates a process 300A for filtering source items used for generating recommendations. FIG. 3B illustrates a process for obtaining related items for recommendations based on usage patterns. The processes 300A, 300B of FIGS. 3A and 3B may be combined and used together in one system. Further, the processes 300A, 300B can be implemented by any of the systems described herein, and in particular, can be implemented by the usage recommender 232 of FIG. 2.

Referring specifically to FIG. 3A, a recommendations process 300A is shown that weights or otherwise filters applications in a user's usage history based on their degree of usage. In certain embodiments, recommendations can then be generated based on the applications that a user used most often, instead of generating recommendations on all applications installed by a user. It is often the case that users will install applications but not use them due to, for example, dislike of an application, buggy code that causes crashes, and so forth. Thus, providing recommendations based on applications that receive greater usage can advantageously result in better recommendations.

At block 302 of the process 300, application(s) used by a user are identified. These applications can be identified by the usage recommender 232 accessing the user data stored in the user data repository 270. As described above with respect to FIG. 2, the data collector 214 and application manager 216 can provide this information to the user data repository 270. Further, the application distribution service 140 can record information about application installs in the user data repository 270 in some embodiments.

Data representing the user's usage of the identified applications is accessed at block 304. This data can include the aggregated usage metrics described above with respect to FIG. 2. At block 3, the user's applications are weighted as source items based on their usage as reflected in the usage data. Source items can be used by the usage recommender to find related items to recommend to the user. However, source items that do not reflect accurately on a user's interests, such as possibly applications that a user has installed but never or rarely uses, may reflect poorly on the user's interests. Thus, the degree to which an application has been used is calculated at block 3, and the application is weighted according to this degree. The degree to which the application is weighted can be a binary value, such as used or not used (or used or rarely used, e.g., not more than once). The degree can also be more fine-grained based on levels of usage. The weightings applied can be binary, such as 1 for used and 0 for not used. An item with a weight of 0, for instance, might be given zero weight by a recommendation algorithm. Weights between 0 and 1 (as merely one example range) can be applied in non-binary embodiments, where items are given weights according to their level of usage.

The weighted source items are used to find related items from an associations dataset (e.g., 252) at block 308. An item-to-item associations dataset generated based on detection of behavioral associations (e.g., item viewing, searching, and purchase) can be used at block 308. In one embodiment, the source items that have a weighting of 1 (or the like) are looked-up in the item-to-item associations dataset to find related or associated items. In another embodiment, the source items with a weighting of 1 or the like are looked up in a usage associations dataset (see FIG. 3B) to find items with related usage characteristics. Alternatively, such in situations where weightings are graded and not binary, each of the source items is used to look up related items in a selected associations dataset. The weights are then applied to the related items to adjust recommendation scores for ranking purposes.

At block 310, a subset of the related items is selected to recommend to the user. The subset can be selected by ranking the related items according to their degree of association with the source items, possibly multiplied by the source items' respective weights. A most highly subset can, but need not, be selected at block 310. Other less-highly ranked subsets can be selected to provide variety to the recommendations output to the user.

Turning to FIG. 3B, an embodiment of a process 300B for providing usage-based recommendations is shown, which obtains recommendations based on usage patterns. At block 322, application(s) installed by a user are identified, for example, in a similar manner as described above with respect to FIG. 3A. Data representing the user's usage of the identified applications is accessed at block 324. This block can include obtaining aggregated metrics regarding the user's application usage, as described above with respect to FIG. 3A. At this point in the process, the process 300 of FIG. 3A can optionally be executed to filter the applications in the user's history based on usage. However, running the process 300 is optional.

At block 326, related applications to the identified application(s) are identified based at least in part on other users' related usage of those applications. This identification of related applications can include accessing the usage associations dataset (252) mined by the data mining module 250 of FIG. 2. As described above, this usage associations dataset can include association scores for pairs of applications based on their degree of similar usage frequency, usage times, usage locations, combinations (e.g., subsets) of the same, and the like.

Identifying related applications based on usage can therefore include looking up an application the user selected in the usage associations dataset to find related applications. The resulting set of related applications can then be ranked according to association score. At block 328, a subset of the related applications is selected to recommend to the user, which is output as a set of recommendations at block 330.

Another way to obtain usage-based recommendations not shown in FIGS. 3A and 3B is to access usage metadata stored in the item data repository 260. As described above, this usage metadata can include statistics such as average usage frequency or time that applications were used. The usage recommender 232 of FIG. 2 can perform blocks 322 and 324 of the process 320 to obtain information about a target user's application usage. In doing so, the usage recommender 232 can calculate an average usage time, average usage frequency, typical locations used, and so forth for a user, averaging such statistics over applications used by the user. The usage recommender 232 can then access the usage metadata in the item data repository 260 to identify items that have similar usage statistics. The usage recommender 232 can, for instance, identify popular items that have such usage statistics and recommend these to the user. Such recommendations can be particularly useful if little or no behavioral data is available for the applications installed on the user's system. Further, if the user's system has few applications installed, the recommendation engine 230 can recommend a set of popular items as default recommendations.

V. Social Recommendations Process

Figure 4:
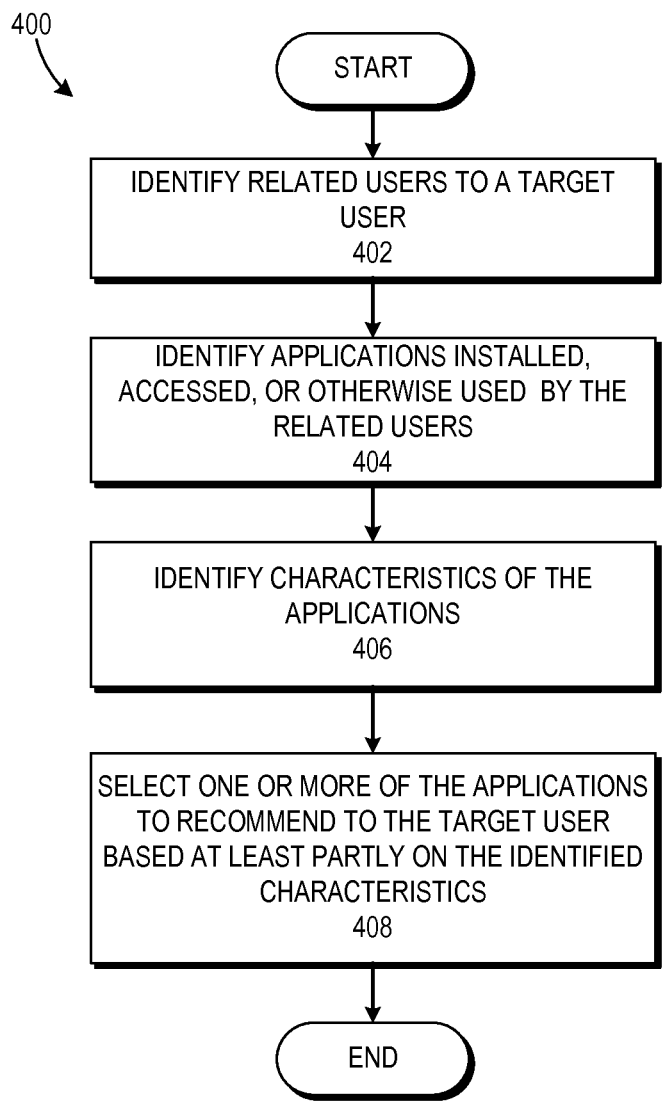
FIG. 4 illustrates an embodiment of a process for providing social-based recommendations.

FIG. 4 illustrates an embodiment of a process 400 for providing social-based recommendations. As described above, social recommendations can take into account a user's social graph or network of related users (such as friends and family). A user's friends may have installed, accessed, or otherwise downloaded applications that may be of interest to the user. The process 400 can determine what these applications are and recommend them to the user, or alternatively, can recommend related applications or other items to the user. The process 400 can be implemented by any of the systems above, for example, by the social recommender 234 of the recommendation system 242.

At block 402, users that are related to a target user are identified. Such users can be friends, relatives, or other acquaintances that have an electronic relationship through a social networking system or the like. For example, Facebook™ or LinkedIn™ friends can be related users. The interactive computing system 110 and/or the social sites 140 of FIG. 1 may also have social networking aspects that enable online relationships between users to be created.

Identifying related users can include determining which users that have accounts with the interactive computing system ("ICS") 110 also have accounts with one or more social sites 140. Determining which social site users are also ICS users can include detecting and/or creating an association between a user account with the ICS 110 and a user account with a social site 120. This association between accounts can be stored in computer storage (e.g., in the user data repository 170 or 270). The detection of user accounts can be made in a variety of ways. In one embodiment, users choose to provide the ICS 110 with access to their data associated with a social site 120. For example, users can provide the ICS 110 with information about which social sites 120 they have accounts with. The users can further provide their user names, links to a social site page they have made, or other account information. In one embodiment, the users therefore opt-in to a recommendation service by providing their identity information to the ICS 110. The ICS 110 can then identify related users using application programmer interfaces (APIs) or other web services made available by the social sites 140.

At block 404, applications installed, accessed, or otherwise used by the related users are identified. These applications can be identified in a variety of ways. In one embodiment, the recommendation service 142 of FIG. 1 communicates with the application distribution service 140 to determine what applications related users of the target user downloaded and/or viewed. In another embodiment, the recommendation service 142 can access a social site 140 of the related user to identify any applications listed there as being used by the user. The recommendation service 142 can identify these applications by using web services or other APIs or by using web scraping technology. The application distribution service 140 can also inspect the files on users' devices to compile a list of applications used on those devices, for example, by identifying package names for the applications installed on each device. The application distribution service 140 can compile this information at times when users access the application distribution service 140 (e.g., to download applications). The application distribution service 140 may obtain users' permission prior to accessing this information. Subsequently, the recommendation service 142 can access this stored information about applications installed on related users' devices to identify such applications (or applications related thereto) for potential recommendation to a target user (see block 406).

With related user's applications identified, the social recommender 234 can output one or more of these applications as recommendations to the target user. However, further refinements to these recommendations may also be made. For instance, as shown in FIG. 4, characteristics of the related users' applications can be identified at block 406, e.g., from the user data repository 270. These characteristics can include any of the usage characteristics described above, such as whether a user used an application, how long, when, where, and the like. The application characteristics can also include high scores in game applications or other achievements that reflect a related user's interest in an application. High scores and other achievements can reflect that user is very interested in an application and can therefore indicate that the application might be a better candidate for recommendation than another application without such demonstrated interest. Similarly, applications that related users use frequently may be better candidates for recommendation than applications that a user rarely uses.

One or more of the applications are selected to recommend to the target user based at least partly on the identified characteristics at block 408. For instance, an intersection of the most popular applications among a user's related users can be recommended to the user. This popularity can be based on the usage time, frequency, achievements, or the other characteristics described above. In another embodiment, this popularity can be based on an application's overall popularity as tracked by the application distribution service 140 as well or instead of based on usage characteristics. If a recommendation is based on a high score or other achievement, the social recommender 234 may report the high score to the target user, and possibly encourage the target user to attempt to beat the high score.

In another embodiment, the social recommender 234 can also or instead recommend applications that are related to the related user's applications. The social recommender 234 can identify such relationships from the item-to-item associations datasets and/or usage associations datasets described above, among other possibilities.

VI. Crossover Recommendations Process

Figure 5:
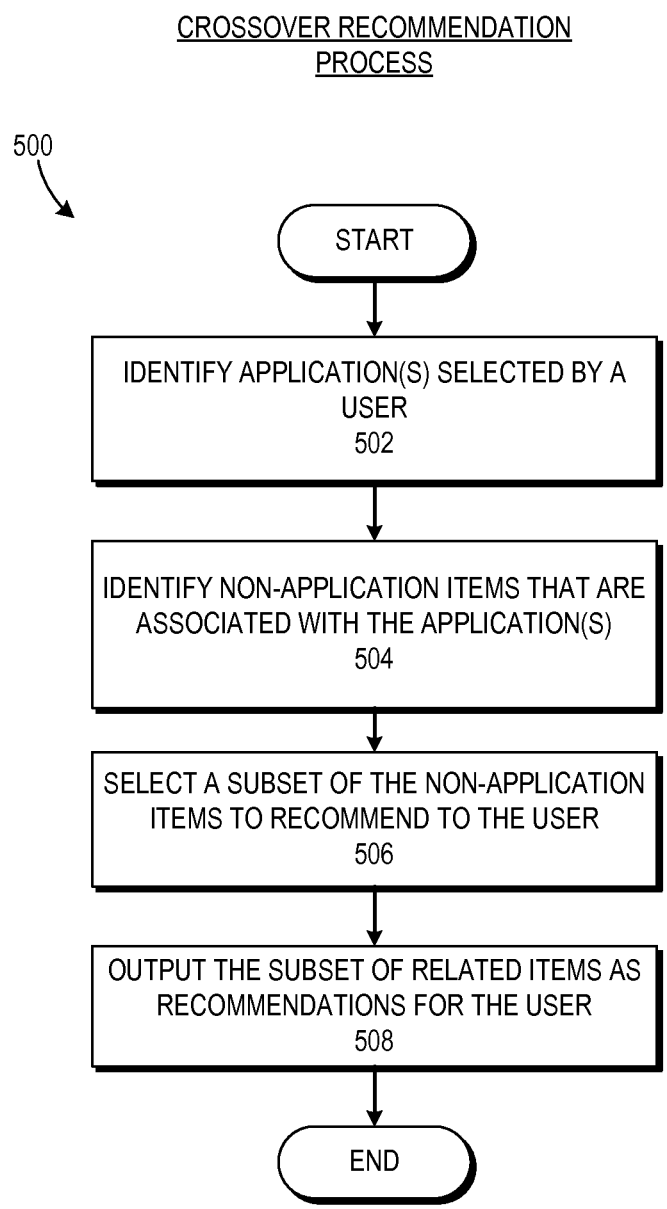
FIG. 5 illustrates an embodiment of a process for providing application-to-item crossover recommendations.

FIG. 5 illustrates an embodiment of a process 500 for providing application-to-other item crossover recommendations. The process 500 can be implemented by any of the systems described above. For example, the process 500 can be implemented by the crossover recommender 236 of the recommendation system 242. Advantageously, in certain embodiments, the process 500 recommends non-application items based on user application selections. Further, in some embodiments, applications can be recommended to users based on their non-application item selections.

At block 502, applications selected by a user are identified. The applications selected can include applications viewed (e.g., in an application store), downloaded, used, or the like. The applications can be weighted according to the strength of their selection. Items merely viewed, for instance, might have a lower weight than items downloaded, which might have a lower weight than items frequently used.

At block 504, non-application items are identified that are associated with the applications. As described above, one possible mined dataset 252 (see FIG. 2) can relate applications and non-application items, such as any item available in the electronic catalog described above with respect to FIG. 1. Since application selection and non-application item selection behavior for users can both be tracked by the ICS 110, relating such behaviors together can be possible. Thus, associations can be made, for instance, between users who use foodie or gourmet cooking applications and users who purchase high-end cookware.

A subset of the non-application items are selected to recommend to the user at block 506, and these recommendations are output to the user at block 508. The non-application items can be recommended on the same device that the user uses to access the applications or on another device. For example, a user may use a mobile phone to access the applications but may use a desktop or laptop to access a web site of the electronic catalog of FIG. 1. The electronic catalog web site can output the recommendations, or the mobile device application (such as the application store client or application manager 216) can output such recommendations.

As described above, the process 400 can be varied to provide application recommendations based on non-application item selections. In this variation, the crossover recommender 236 can use the same dataset used with respect to the process 400 to identify applications that are related to non-application item selections the user made. Thus, for example, high-end cookware can be recommended to users who use foodie-related applications.

VII. Example Recommendations User Interface

Figure 6:
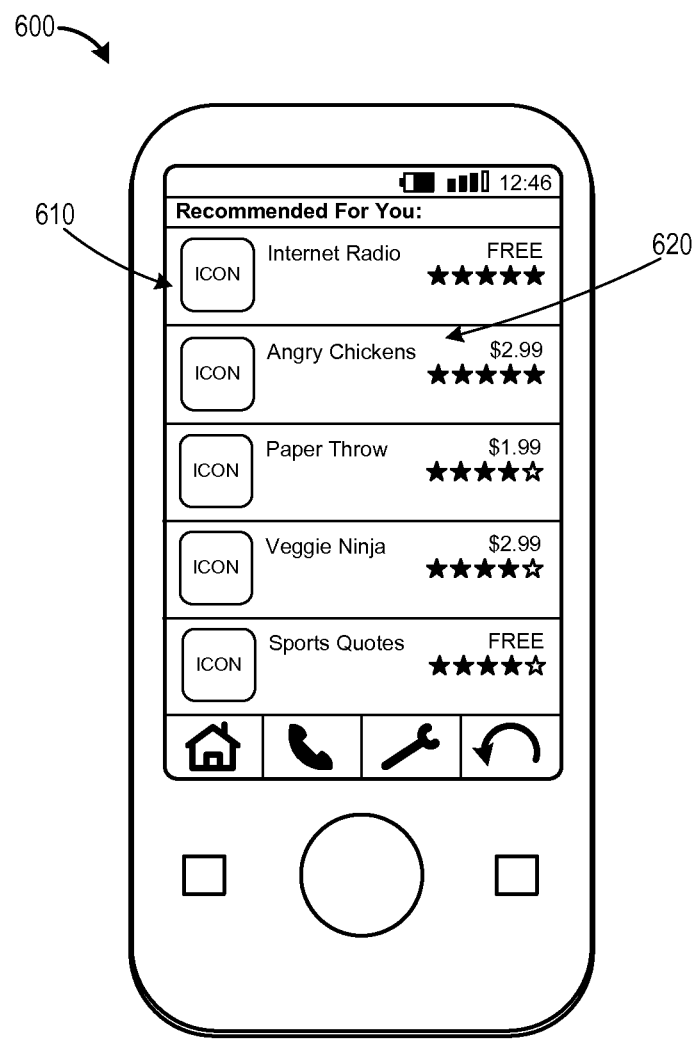
FIG. 6 illustrates an embodiment of a mobile device having a user interface for displaying recommendations.

FIG. 6 illustrates an embodiment of a mobile device 600 having a user interface for displaying recommendations. The mobile device is in the form of a mobile handheld device, smart phone, or the like. The mobile device includes a display screen 610 that lists applications recommended for a particular user (such as "Internet Radio," "Angry Chickens," and the like). The user can select one or more of the recommendations to download the application(s). The recommendations user interface displayed on the display screen 610 is merely one example of many formats that can be used to display recommendations, other examples of which are described in U.S. Publication No. 2002/0198882 referred to above.

VIII. Other Embodiments

It should be noted that the outputs of the usage recommender 232, social recommender 234, crossover recommender 236, and other recommenders 238 of FIG. 2 may be combined. Further, these different recommenders can call each other to filter the recommendations of the other. For instance, the social recommender 234 can identify initial recommendations based on a user's related users and then call the usage recommender 234 to obtain usage-related items to these initial recommendations. Likewise, the crossover recommender 236 can filter the application results derived from non-application item selections according to usage, ranking the results based on usage. Further, it should be understood that usage can be tracked for items other than applications, including electronic or computer hardware, ebooks, and the like, and usage-based recommendations can be made for such items. Many other combinations between these and other recommendation algorithms are possible.

IX. Terminology

Depending on the embodiment, certain acts, events, or functions of any of the algorithms described herein can be performed in a different sequence, can be added, merged, or left out all together (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method of recommending personalized computer applications to users, the method comprising:
receiving usage data collected from a computing device of a user, the usage data reflecting a degree of usage of user applications installed on the computing device of the user, the degree of usage reflecting a selected usage pattern that indicates how often the user applications were used;
identifying one or more related applications that are related to the user applications by at least comparing the usage data for the user to usage of the one or more related applications by other users, said identifying comprising identifying an application that was used with a similar usage pattern to the selected usage pattern;
weighting the user applications in the usage data based at least in part on the degree of usage of each application, such that the user applications used more frequently by the user are weighted more heavily than the user applications used less frequently by the user; and
selecting a subset of the related applications as recommendations for the user based at least in part on the weightings, thereby filtering the recommendations based on the degree of usage of the user applications;
wherein at least said identifying is implemented by one or more processors.

2. The method of claim 1, wherein the usage data reflects one or more of the following:
a selected frequency that the one or more user applications were used on the computing device; and
a selected amount of time that the one or more user applications were used on the computing device.

3. The method of claim 2, wherein said identifying the one or more related applications comprises identifying an application that was used a similar amount of time as the selected amount of time.

4. The method of claim 2, wherein said identifying the one or more related applications comprises identifying an application that was used at a similar frequency as the selected frequency.

5. The method of claim 1, wherein the usage data reflects a selected time period in which the one or more used applications were used.

6. The method of claim 5, wherein said identifying the one or more related applications comprises identifying an application that was used at a related time period to the selected time period.

7. The method of claim 1, wherein the usage data reflects a selected location in which the one or more used user applications were used.

8. The method of claim 7, wherein said identifying the one or more related applications comprises identifying an application that was used at a related location to the selected location.

9. The method of claim 1, wherein the usage data reflects a selected device other than the computing device of the user with which the one or more user applications were used.

10. The method of claim 9, wherein said identifying the one or more related applications comprises identifying an application that was used with a related device to the selected device.

11. Non-transitory physical storage comprising computer-executable instructions configured to implement a method of recommending personalized computer applications to users, the method comprising:
receiving usage data associated with a computing system of a user, the usage data reflecting a degree of usage of a plurality of user applications installed on the computing system;
identifying a subset of the user applications that have relatively higher usage by the user than others of the user applications, wherein said identifying the subset of user applications comprises identifying any of the user applications that have more than one usage by the user;
identifying, by one or more computing devices, one or more related applications related to the subset of user applications, wherein said identifying the one or more related applications comprises accessing the one or more related applications from a data set that relates applications based at least partly on an analysis of application selection behavior by a plurality of users; and
weighting the user applications in the usage data based at least in part on the degree of usage of each application, such that the user applications used more frequently by the user are weighted more heavily than the user applications used less frequently by the user;
selecting a subset of the related applications as recommendations for the user based at least in part on the weightings, thereby selecting the recommendations based on the degree of usage of the user applications.

12. The non-transitory physical storage of claim 11, wherein said identifying the one or more related applications comprises comparing the usage data for the subset of user applications to usage of the one or more related applications by other users.

13. The non-transitory physical storage of claim 12, wherein said identifying the one or more related applications comprises identifying usage metadata associated with the one or more related applications and comparing the usage metadata to the usage data for the subset of user applications.

14. A system for recommending personalized computer applications to users, the system comprising:
an application distribution service configured to provide applications for download by a plurality of user computing systems; and
a recommendation service comprising computer hardware, the recommendation service comprising a usage recommender configured to:
receive usage data associated with a selected computing system of a selected user, the usage data reflecting a degree of usage of a plurality of user applications installed on the computing system, the user applications being obtained from the application distribution service;
identify a subset of the user applications that have relatively higher usage by the user than others of the user applications;
identify, by one or more computing devices, one or more related applications related to the subset of user applications by at least comparing the usage data for the subset of user applications to usage of the one or more related applications by other users, said comparing comprising performing one or more of the following: identifying a first application of the subset of user applications that was used at a similar frequency as a selected one of the one or more user applications and identifying a second application of the subset of user applications that was used at a related location as a selected one of the one or more user applications;

apply weights to the user applications in the usage data based at least in part on the degree of usage of each application, such that the user applications used more frequently by the user are weighted more heavily than the user applications used less frequently by the user; and select a subset of the related applications as recommendations for the user based at least in part on the weights to thereby select the recommendations based on the degree of usage of the user applications.

15. The system of claim 14, wherein the usage recommender is further configured to identify the one or more related applications by at least identifying an application that was used a similar amount of time as a selected one of the one or more user applications.

16. The system of claim 14, wherein the usage recommender is further configured to identify the one or more related applications by at least identifying an application that was used at a related time period as a selected one of the one or more user applications.

* * * * *

UNITED STATES PATENT AND TRADEMARK OFFICE
CERTIFICATE OF CORRECTION

| | | |
|---|---|---|
| PATENT NO. | : 8,452,797 B1 | Page 1 of 1 |
| APPLICATION NO. | : 13/044196 | |
| DATED | : May 28, 2013 | |
| INVENTOR(S) | : Paleja et al. | |

It is certified that error appears in the above-identified patent and that said Letters Patent is hereby corrected as shown below:

In the Specifications:

In column 7 at line 41, Change "fore" to --for--.

In column 13 at line 44, Change "programmer" to --programming--.

In the Claims:

In column 17 at line 55, In Claim 7, changed "used user" to --user--.

Signed and Sealed this
Twelfth Day of November, 2013

Teresa Stanek Rea
*Deputy Director of the United States Patent and Trademark Office*